United States Patent
Oda et al.

(10) Patent No.: US 6,937,867 B2
(45) Date of Patent: Aug. 30, 2005

(54) MOBILE STATION AND ITS PROGRAM

(75) Inventors: Kyoji Oda, Gamagori (JP); Tatsuya Shintai, Chita-gun (JP); Atsushi Hayashida, Kariya (JP); Hiroyasu Ogino, Okazaki (JP); Toshihiro Takeuchi, Tokoname (JP); Michio Shamoto, Niwa-gun (JP)

(73) Assignee: Denso Corporation, Kariya (JP)

( * ) Notice: Subject to any disclaimer, the term of this patent is extended or adjusted under 35 U.S.C. 154(b) by 400 days.

(21) Appl. No.: 10/224,355

(22) Filed: Aug. 21, 2002

(65) Prior Publication Data

US 2003/0045303 A1 Mar. 6, 2003

(30) Foreign Application Priority Data

Aug. 29, 2001 (JP) .......................................... 2001-260215

(51) Int. Cl.[7] .................................................. H04Q 7/20
(52) U.S. Cl. ................................. 455/456.1; 455/456.5; 455/457; 342/357.01
(58) Field of Search ........................... 455/456.1, 456.2, 455/456.5, 457; 342/357.01, 357.06, 357.12, 450

(56) References Cited

U.S. PATENT DOCUMENTS 6,289,279 B1    9/2001    Ito et al.
6,314,295 B1 *  11/2001   Kawamoto ............... 455/456.2
6,389,291 B1 *  5/2002    Pande et al. ............. 455/456.5

FOREIGN PATENT DOCUMENTS

JP    A 2000-155163    6/2000
JP    A 2000-348297   12/2000

* cited by examiner

Primary Examiner—Erika A. Gary
(74) Attorney, Agent, or Firm—Oliff & Berridge, PLC

(57) ABSTRACT

A mobile station requests a start of positioning and receives a response of positioning from a positioning server, following which it informs the positioning server of its own station information and neighboring base station information gathered through searching the neighboring base stations. Thereby, the mobile station receives assistant information regarding GPS satellites to be captured based on a station location designated by the positioning server and then it measures a GPS signal and a base station signal such as an apparent signal delay. In the case that the positioning information collected as described above is sufficient for location computing, it displays the location computed by the positioning server. In contrast, in the case that the positioning information is insufficient, it displays "positioning impossible" without sending the positioning information to the positioning server.

11 Claims, 2 Drawing Sheets

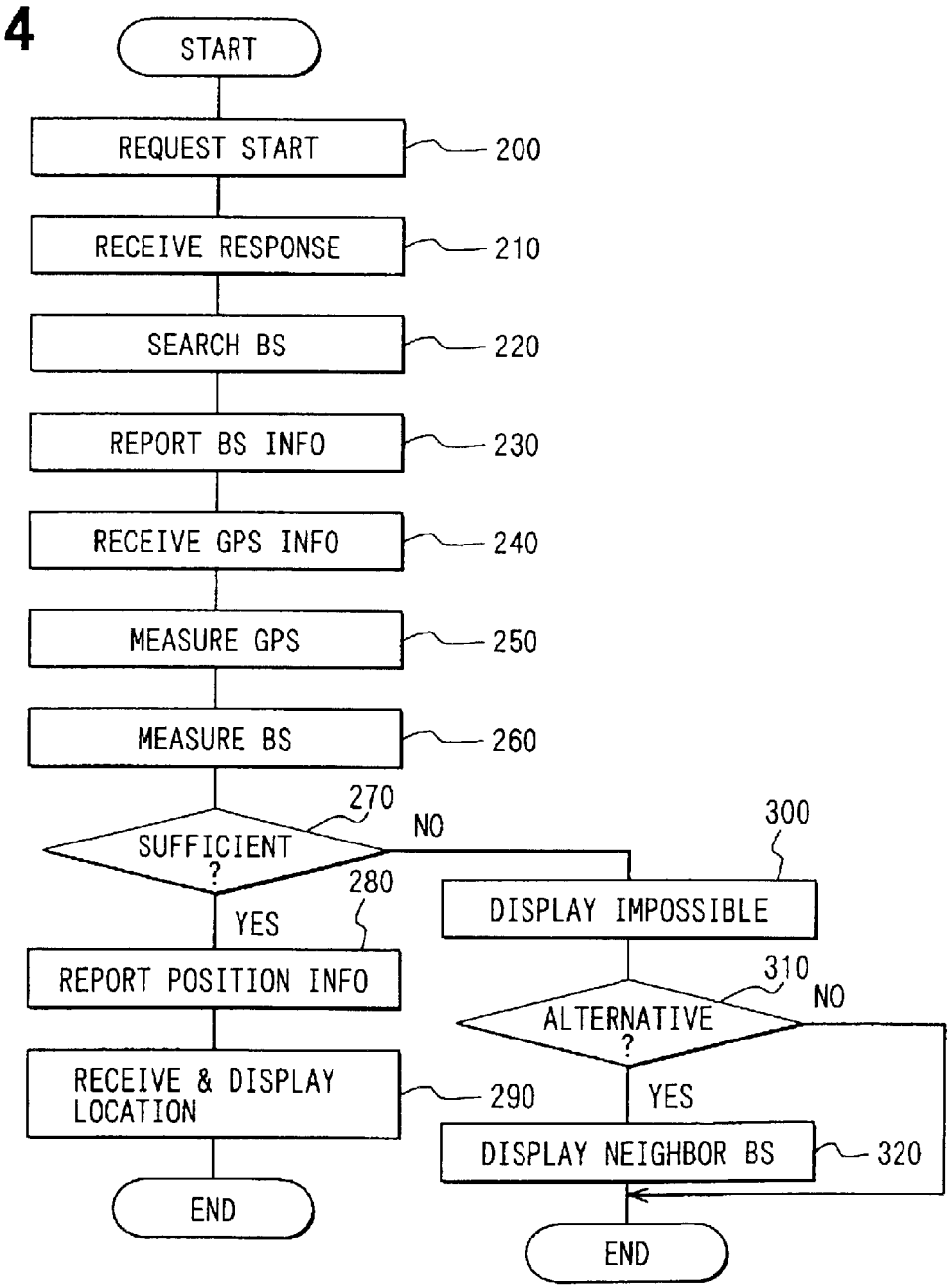

MOBILE STATION AND ITS PROGRAM

CROSS REFERENCE TO RELATED APPLICATION

This application is based on and incorporates herein by reference Japanese Patent Application No. 2001-260215 filed on Aug. 29, 2001.

FIELD OF THE INVENTION

The present invention relates to a mobile station such as a cellular phone or a mobile device, which communicates through wireless line with a base station and is suitable for determining its own location.

BACKGROUND OF THE INVENTION

A positioning system for a mobile station (MS) is practically used in a wireless communication network, for example, in a cellular phone network. In such a system, a MS sends measured information to a positioning server (PSV) set up in the network and the MS is able to obtain its own location information computed by the PSV. More specifically, the MS measures a Global Positioning System (GPS) signal from GPS satellites and apparent signal delays from base stations (BS) synchronized to the GPS. The MS sends the measured information to the PSV. The PSV executes computing for positioning of the MS (location computing) based on the information sent by the MS, and notifies the MS of the computed location.

It is necessary for location computing that the total of the BSs whose apparent signal delays are measured and the GPS satellites which are captured should be three at a minimum. If the total is three, the two-dimensional location (latitude, longitude) of the MS can be determined. If the total is not less than four, the three-dimensional location (latitude, longitude, altitude) of the MS can be determined.

However, since the MS directly sends the PSV the information measured or gathered even if the above information necessary for the location computing is insufficient and awaits a response from the PSV, it results in the failure of positioning due to the failure of computing. Accordingly, unnecessary accesses to the PSV and unnecessary computing in the PSV are performed, causing waste of time and resources.

SUMMARY OF THE INVENTION

The present invention solves the above problems and enables a mobile station to take a quick action with preventing a position server from useless computing when the mobile station is unable to obtain the sufficient information for location computing in the position server.

According to the present invention, in the case that information collected is insufficient for location computing in a position server (PSV), a mobile station (MS) outputs, as an alternative, location information included in the information previously collected without sending the information to the PSV via network.

This procedure saves useless accesses to the network and useless location computing in the network. It furthermore helps users to roughly know their locations instead of waiting for the due notification of positioning failure even if necessary information is insufficiently collected.

BRIEF DESCRIPTION OF THE DRAWINGS

The above and other objects, features and advantages of the present invention, will become more apparent from the following detailed description made with reference to the accompanying drawings. In the drawings:

FIG. 3 is a flow diagram illustrating major steps for collecting information in an idle state in the mobile station shown in FIG. 2; and FIG. 4 is a flow diagram illustrating major steps for collecting information in the mobile station shown in FIG. 2.

DETAILED DESCRIPTION OF THE PREFERRED EMBODIMENTS

Figure 1:
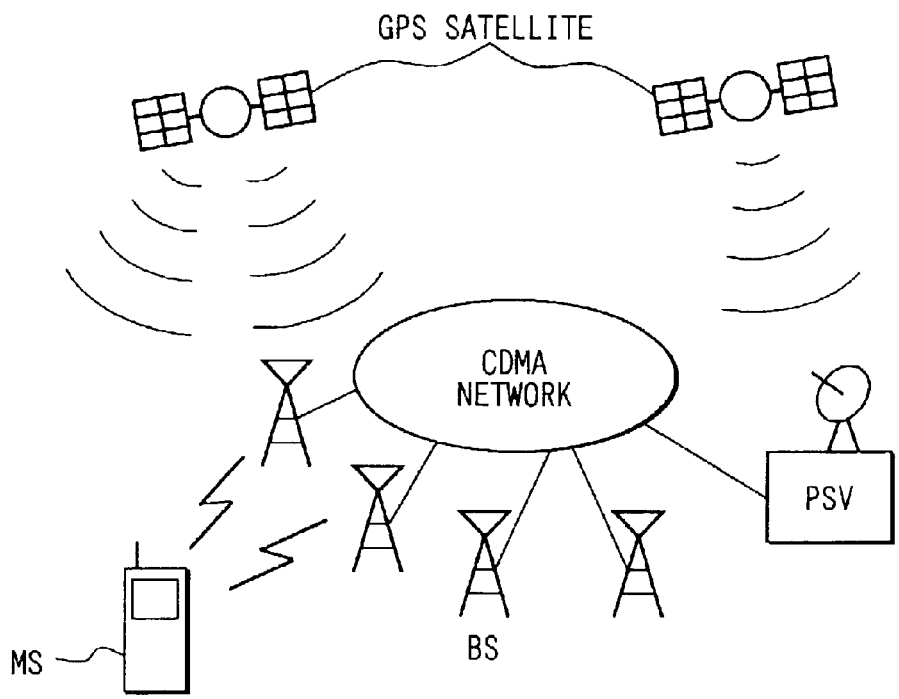
FIG. 1 is a schematic diagram illustrating a communication system.

FIG. 1 shows an overview of the Code Division Multiple Access (CDMA) network including a mobile station MS of an embodiment of the present invention. The mobile station MS communicates with a base station BS connecting to the CDMA network. A positioning server PSV is also included in the CDMA network and specializes in location computing with using necessary information sent by the mobile station MS. The base station BS and the positioning server PSV receive signals from GPS satellites and their system clocks are synchronized to the GPS signal. Moreover, the mobile station MS is capable of receiving the GPS signals which is to be sent via network to the positioning server PSV as the information necessary for location computing of the mobile station MS location.

Figure 2:
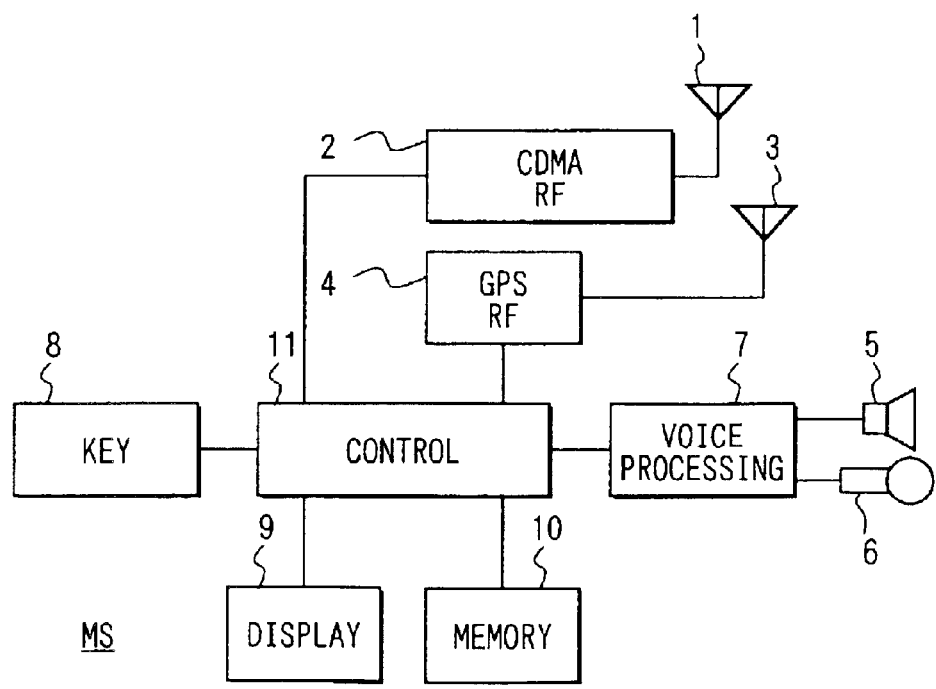
FIG. 2 is a structural block diagram illustrating a mobile station according to an embodiment of the present invention.

Referring to FIG. 2, the mobile station MS includes a CDMA antenna 1 and a CDMA radio frequency (RF) section 2 for communicating with the base station BS, a GPS antenna 3 and a GPS RF section 4 for receiving the signals from GPS satellites, a speaker 5, a microphone 6, and a voice processing section 7 for interfacing by voice to a user of the mobile station MS, a key manipulation section 8 for manipulation input, a display 9 for displaying various information to the user, a memory section 10 for storing data and a program, and a control section 11 for executing the program and controlling each section of the mobile station MS. In addition, the GDMA antenna 1 and the GPS antenna 3 may be combined to one antenna. A touch-panel type of a display may be substituted for the key manipulation section 8. By using the voice processing section 7 as a user interface, the microphone 6 may be substituted for the key manipulation section 8 and the speaker 5 may be substituted for the above display 9.

Referring to FIG. 3 and FIG. 4, an executing procedure for a computer of the mobile station MS is explained as follows. In the following explanation, a pseudorandom noise (PN) code is defined as a spread code in a CDMA method and the number of the PN code types is 512 maximum each of which is respectively assigned to a base station BS. The mobile station MS synchronized to the base station BS identifies the base station BS by determining from a period (phase lag) covering until a time of correlating peak generated from a starting time for a cycle of the series of the PN codes when reversely spread by the PN code in a received signal. An apparent signal delay is defined as a signal delay amount corresponding to a propagation time between the base station BS and the mobile station MS against the phase lag in relation to the above PN code.

The positioning server PSV executes location computing for the mobile station MS as follows. At first, a mobile station MS obtains necessary information including a GPS signal (satellite number, receiving time) and a set of PN code and apparent signal delay of neighboring base stations BS and a reference base station BS which is selected due to the minimum apparent signal delay (namely, assumed to be the closest from the mobile station MS). The mobile station MS sends the above necessary information to the positioning server PSV. Based on the information, the positioning server PSV identifies latitude and longitude of each base station BS from a database corresponding to the PN code, calculates distance between the mobile station MS and each base station BS from the apparent signal delays of the other base stations BS against the reference base station BS being a time basis, calculates distance between the mobile station MS and the GPS satellite from the GPS satellite number and the receiving time, and determines a location of the mobile station MS with a principle of triangulation.

Referring to FIG. 3, the mobile station MS is in an idle state (waiting state), as defined to be in no communication or to be just after the turning on of power. The mobile station MS searches a neighboring base station BS according to a neighbor list described later and selects as a serving base station BS the base station BS whose receiving signal strength is highest (step 100). Then, the mobile station MS obtains overhead information by receiving a paging channel from the serving base station BS (step 110). The overhead information includes a PN code and an identification code of the serving base station BS, location information (latitude, longitude) of the serving base station BS, a frequency to be used, the neighbor list listing up the neighboring base stations BS, a network ID (identifier), and the others. The mobile station MS intermittently obtains the overhead information and updates the content of the information in the idle state.

In such an occasion of turning on of the mobile station MS after the long distance move, the mobile station MS may not find the neighboring base stations BS in the neighbor list previously obtained. In this instance, the mobile station MS selects as a first serving base station BS the base station BS captured by searching a PN code in order, then obtains the overhead information, and subsequently updates the information in the idle state according to the flow diagram of FIG. 3.

Referring next to FIG. 4, an obtaining procedure of positioning information necessary for location computing is explained as follows. A request for a positioning start is sent to a network through a trigger of manipulating a key by users who wish to know their locations as long as their mobile stations MS are located in a communication zone (step 200). If the mobile stations MS are located in the outer of the communication zone, the procedure should proceed to step 300 as described later.

The mobile station MS receives a response of positioning from the positioning server PSV via network according to the request for the positioning start by the mobile station MS (step 210), searches the neighboring base stations BS depending on the neighbor list described above, selects as a reference base station BS the base station BS whose PN code is found out to be the minimum apparent signal delay among the PN codes received from the base stations BS, and temporarily stores the PN codes and the apparent signal delays of the reference BS and other neighboring base stations BS in the memory section 10 as base station BS information (step 220).

Here, the reference base station BS having the minimum apparent signal delay is assumed to be the closest base station BS to the mobile station MS.

The mobile station MS reports its own mobile station MS information and the above base station BS information to the positioning server PSV (step 230).

The positioning server PSV roughly sets the location of the mobile station MS, based on the received information, and sends back to the mobile station MS a GPS satellite number and its capturing parameter as assistant positioning information, which the mobile station MS is to receive (step 240).

The mobile station MS, based on the assistant positioning information, receives the GPS signals from the GPS satellites, stores the GPS signal whose amplitude exceeds a threshold level, and counts the GPS as a receivable satellite (step 250). The mobile station MS re-measures the apparent signal delay of the neighboring base station BS as updated information and counts as a receivable base station BS the base station BS which can be measured. Thereby, the mobile station MS obtains the positioning information comprising the PN codes and the signal delays from the receivable base stations BS and the GPS signals from the receivable GPS satellites (step 260).

In next step 270, whether the information necessary for the location computing is sufficient or not, namely the total of the receivable base stations BS and GPSs counted at steps 250 and 260 is less than three or not, is determined. If the total is not less than three, the procedure should proceed to step 280. If the total is less than three, the procedure should proceed to step 300.

At step 280, since it is possible for the positioning server PSV to execute the location computing, the mobile station MS sends the positioning server PSV the positioning information comprising the PN codes and the signal delays from the receivable base stations BS and the GPS signals from the receivable GPS satellites. The positioning server PSV computes the location of the mobile station MS based on the positioning information sent by the mobile station MS and returns the computed result to the mobile station MS. The mobile station MS receives the result and report the mobile station MS user the result with displaying it on the display 9 (step 290).

At step 300, in contrast, since the positioning information for computing is not sufficient, the mobile station MS displays "positioning impossible" on the display 9 and inquires the mobile station MS user whether the neighboring base station BS location should be displayed or not at step 310. If the displaying is not required, the procedure proceeds to the end. If the displaying is required, the serving base station BS location previously obtained is displayed. The displayed location of the base station BS may be any one of an address, a set of latitude and longitude, and a surrounding area map.

In the above embodiment, though the serving base station BS being the communicating object in a waiting state is selected as the neighboring base station BS, the reference base station BS whose apparent signal delay is the minimum among the neighboring base stations BS may be also selected as the closest base station BS. Here, in order for the mobile station MS to obtain the reference base station BS location, the mobile station MS may obtain the overhead information including the reference base station BS location information through receiving the paging channel of the reference base station BS after selecting the reference base station BS at step 220. In addition, even if the positioning information is sufficiently obtained, the display regarding the reference base station BS location may be immediately outputted such as "you are near the location of this base station" while saving the computing by the positioning server PSV, according to the user's request.

Moreover, a function of collecting and displaying location information may be realized by a computer program being stored in the memory 10 and accordingly executed by the control section 11. The program may be distributed to the mobile station MS via network and stored in the memory 10 for the usage as appropriate.

As described above, when the mobile station MS user wishes to know his or her own location, the mobile station MS of the embodiment of the present invention is able to immediately notifies the user of an effect of "positioning impossible" by saving the useless access to the positioning server PSV without keeping the user waiting, even if the mobile station MS fails in collecting the information necessary for location computing. In addition, at the user's request, the neighboring base station BS location may be displayed. As the neighboring station, the reference base station BS which is assumed to be the closest to the mobile station MS may be displayed, which instance much more contributes to user-friendliness.

Moreover, in the case that the mobile station MS determines that positioning information is insufficient for computing in the positioning server PSV, the mobile station MS may send the positioning server PSV a signal meaning "interrupt positioning", and simultaneously output the effect of "positioning impossible" or the serving base station location on the display 9.

What is claimed is:

1. A mobile station which communicates via a wireless line with a base station forming a communication network within which a station location of said mobile station is computed, said mobile station including:
    means for collecting positioning information necessary for computing the station location, said positioning information including at least base station information of said base station;
    means for sending said positioning information to said communication network;
    means for obtaining station location information computed in said communication network based on said positioning information which is sent to said communication network;
    means for outputting said station location information to a mobile station user;
    means for determining whether said positioning information is sufficient for computing the station location; and
    means for outputting information included in said positioning information previously collected as alternative station location information to the mobile station user without sending said positioning information to said communication network when said positioning information is determined to be not sufficient for computing the station location.

2. A mobile station as claimed in claim 1, further including:
    a GPS receiving section which receives a GPS signal from GPS satellites,
    wherein said positioning information necessary for computing the station location includes said GPS signal.

3. A mobile station as claimed in claim 1, wherein said information outputted as the alternative station location information indicates location information of a neighboring base station which is captured.

4. A computer program product in a computer-readable medium for instructing a computer contained in a mobile station communicating via a wireless line with a base station forming a communication network within which a station location of said mobile station is computed, the computer program product comprising:
    a step of collecting positioning information necessary for computing the station location, wherein said positioning information includes at least base station information of said base station;
    a step of determining whether said positioning information collected is sufficient for computing the station location in said communication network;
    a step of sending said positioning information to said communication network when said positioning information collected is determined to be sufficient for computing the station location in said communication network;
    a step of receiving station location information computed in said communication network; and
    a step of displaying information included in said positioning information previously collected as alternative station location information to display means without sending said positioning information to said communication network when said positioning information collected is determined to be not sufficient for computing the station location in said communication network.

5. A computer program product as claimed in claim 4, wherein said information as the alternative station location information displayed indicates location information of a neighboring base station.

6. A mobile station which communicates via a wireless line with a base station and a positioning server within a communication network, wherein a station location of said mobile station is computed in the positioning server, said mobile station including:
    means for collecting positioning information necessary for computing the station location, said positioning information including at least base station information of said base station;
    means for sending said positioning information to said positioning server;
    means for obtaining said station location information computed in said positioning server based on said positioning information which is sent to said positioning server;
    means for outputting said station location information to a mobile station user;
    means for determining whether said positioning information is sufficient for computing the station location; and
    means for outputting a message indicating that computing the station location is impossible without sending said positioning information to said positioning server when said positioning information is determined to be insufficient.

7. A mobile station as claimed in claim 6, said mobile station further including:
    means for outputting a message indicating that location computing is impossible without sending said positioning information to said positioning server when said positioning information is determined to be insufficient for computing said station location in said positioning server even if positioning information is collected from not less than one base station and said mobile station is located inside a communication zone.

8. A mobile station as claimed in claim 6, said mobile station further including:
    means for displaying and confirming whether a location of neighboring base station should be outputted when said message indicating that positioning is impossible is outputted; and means for sequentially displaying location information of the neighboring base station according to the user's instruction.

9. A mobile station which communicates via a wireless line with a base station and a positioning server within a communication network, wherein a station location of said mobile station is computed in said positioning server, said mobile station including:

means for collecting positioning information necessary for computing the station location, said positioning information including at least base station information of said base station;

means for sending said positioning information to said positioning server;

means for obtaining station location information computed in said positioning server based on said positioning information which is sent to said positioning server;

means for outputting said station location information to a mobile station user;

means for determining whether said positioning information is sufficient for computing the station location; and means for outputting location information corresponding to the base station included in said positioning information without sending said positioning information to said positioning server when the positioning information is determined to be insufficient.

10. A mobile station which communicates via a wireless line with a base station and a positioning server within a communication network, wherein a station location of said mobile station is computed in said positioning server, said mobile station including:

means for collecting positioning information necessary for computing the station location, said positioning information including at least base station information of said base station;

means for sending said positioning information to said positioning server;

means for obtaining said station location information computed in said positioning server based on said positioning information which is sent to said positioning server;

means for outputting said station location information to a mobile station user;

means for determining whether said positioning information is sufficient for computing the station location; and means for outputting a message indicating that location computing is impossible to the mobile station user along with sending a signal indicating interruption of positioning to said positioning server when said positioning information is determined to be insufficient.

11. A mobile station which communicates via a wireless line with a base station and a positioning server within a communication network, wherein a station location of said mobile station is computed in the positioning server, said mobile station including:

means for collecting positioning information necessary for computing the station location, said positioning information including at least base station information of said base station;

means for sending said positioning information to said positioning server;

means for obtaining station location information computed in said positioning server based on said positioning information which is sent to said positioning server;

means for outputting said station location information to a mobile station user;

means for determining whether said positioning information is sufficient for computing the station location; and means for outputting location information corresponding to said base station included in said positioning information to the mobile station user along with sending a signal indicating interruption of positioning to said positioning server when said positioning information is determined to be insufficient.

* * * * *